(No Model.)

J. A. MURRAY, Dec'd.
K. F. MURRAY, Administratrix.
PIPE JOINT AND COUPLER.

No. 504,739. Patented Sept. 12, 1893.

Witnesses:—
C. F. Caldwell.
H. S. Johnson.

Inventor:—
James A. Murray,
per Paul A. Merwin
Attorneys.

UNITED STATES PATENT OFFICE.

JAMES A. MURRAY, OF MINNEAPOLIS, MINNESOTA; KATE F. MURRAY ADMINISTRATRIX OF SAID JAMES A. MURRAY, DECEASED.

PIPE JOINT AND COUPLER.

SPECIFICATION forming part of Letters Patent No. 504,789, dated September 12, 1893.

Application filed February 23, 1892. Serial No. 422,356. (No model.)

*To all whom it may concern:*

Be it known that I, JAMES A. MURRAY, of Minneapolis, Hennepin county, Minnesota, have invented a certain new and Improved Pipe Joint and Coupler, of which the following is a specification.

My invention relates to improvements in the joints of metallic pipes and the couplings of flexible hose, its object being to provide a coupling or joint which may be readily connected together so as to be perfectly gas or water tight, without the use of lead, oakum or other packing.

To this end my invention consists in providing a joint or coupling having a female member provided with an annular groove concentric with its axis, and a male member provided with an annular rib adapted to fit into the groove in the female member, both members being provided with flanges which are clamped or bolted together, so as to force said rib into said groove. In the bottom of the groove is arranged a packing ring or gasket, upon which the edge of the rib bears, and a gasket may also be arranged between the faces of the members.

My invention further consists in the construction and combination hereinafter described and particularly pointed out in the claim.

Figure 3:
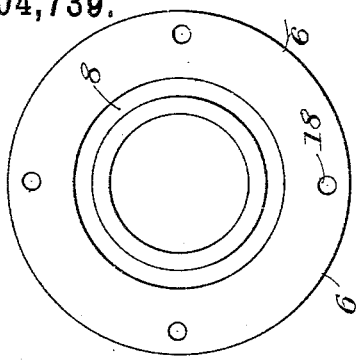
Figure 1:
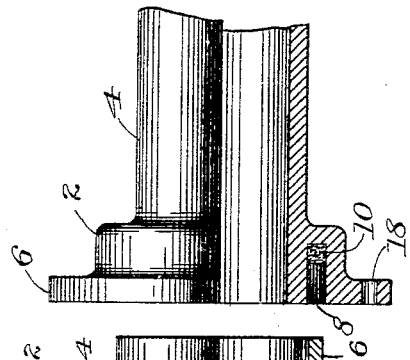
Figure 2:
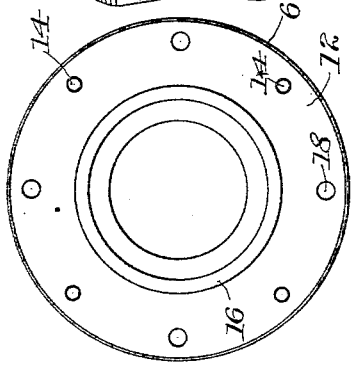
Figure 4:
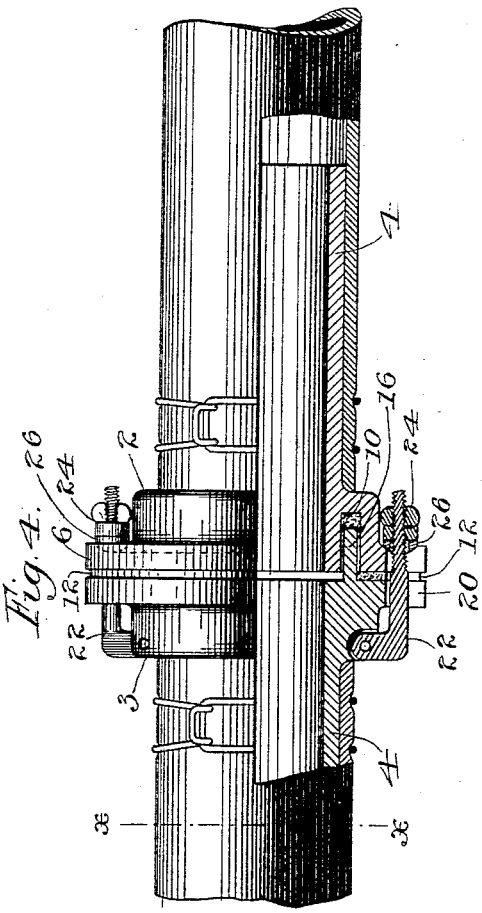
Figure 5:
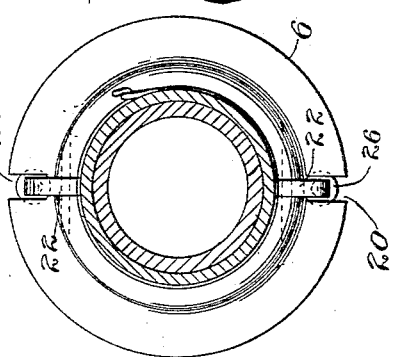

In the accompanying drawings forming part of this specification, Figure 1 is a side elevation and partial section of my improved pipe joint, the members being slightly separated. Figs. 2 and 3 are respectively end elevations of the meeting faces of the two members of the joint. Fig. 4 is a side elevation and partial section of my improved hose coupling, and Fig. 5 is a rear elevation of one of the male coupling members, the hose being cross sectioned on line X—X.

In the drawings 2 represents the female member of the joint or coupling, which is formed integral with the pipe 4 and has an enlarged head provided with the circumferential flange 6. Arranged in the face of this member, concentric with the axis of the pipe, is the annular groove 8. In the bottom of this groove is arranged an annular packing ring or gasket 10, formed of any suitable material, such as asbestos. There may also be arranged on the face of the male member 3, an annular gasket 12 against which the face of the female member bears. This gasket may be secured in place in any suitable manner, as by means of rivets 14 extending through the flange 6. The male member 3 is provided with the annular rib 16 corresponding to the groove 8, adapted to enter the same when the sections of pipe are brought together, and to bear upon the packing ring 10, the joint of the pipe being closed tightly by means of bolts passed through the bolt holes 18 in the flanges 6, in the ordinary manner.

In the case of hose couplings, a more expeditious means in securing the coupling is necessary, and I therefore cut notches 20 in the opposite sides of the flanges 6, and pivot upon one of the members the hooked button bolts 22, which can be turned so as to lie in the notches, when the coupling is brought together, where they are secured by means of the thumb screws 24. In order to hold them firmly in place when screwed down, I preferably form in the rear side of the flange of the opposite coupling, an annular groove into which convex washers 26 are fitted, and thus hold the bolts from slipping. From this latter construction it is evident that the hose may be coupled and uncoupled in a few moments and much more expeditiously than when secured by means of a screw thread.

I claim—

In a pipe coupling, the combination of the section of pipe having at its end an annular groove formed in its face and a circumferential flange lying outside of said groove and in the same plane with the face end of the pipe and formed with open slots, the other section of pipe having a rib projecting from its face to enter the groove in the opposite section and formed with a circumferential flange lying outside of said rib and having open slots registering with the open slots in the flange of the other pipe section, the flange to one of the pipe-sections having a groove formed in its rear face, button-bolts hinged to one section back of its flange and lying in the slot of that flange and also in the slot of the opposite flange whereby the walls of the slots in both sections form a brace for said bolts and take the strain from their hinges, a washer applied to the ends of the bolts and lying in the groove of one flange, and nuts for clamping the parts together, substantially as and for the purposes described.

In testimony whereof I have hereunto set my hand this 11th day of February, 1892.

JAMES A. MURRAY.

In presence of—
T. D. MERWIN,
H. S. JOHNSON.